United States Patent
Humer (12) United States Patent Humer (10) Patent No.: US 10,632,814 B2
(45) Date of Patent: Apr. 28, 2020

(54) TEMPERATURE CONTROL SYSTEM PROVIDING CONDUCTIVE HEATING AND COOLING FOR A SEAT

(71) Applicant: Lear Corporation, Southfield, MI (US)

(72) Inventor: Mladen Humer, West Bloomfield, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 15/883,291

(22) Filed: Jan. 30, 2018

(65) Prior Publication Data

US 2018/0272836 A1   Sep. 27, 2018

Related U.S. Application Data

(60) Provisional application No. 62/475,691, filed on Mar. 23, 2017.

(51) Int. Cl.
*B60H 1/00* (2006.01)
*B60N 2/56* (2006.01)

(52) U.S. Cl.
CPC ..... *B60H 1/00285* (2013.01); *B60H 1/00478* (2013.01); *B60N 2/5642* (2013.01); *B60N 2/5692* (2013.01)

(58) Field of Classification Search
CPC ..... B60H 1/00285; F24F 5/0046; F24F 11/85; F24F 11/83; F24F 5/0007; F24F 2140/20; H05K 7/20827; B60N 2/5642; B60N 2/5692
See application file for complete search history.

(56) References Cited

U.S. PATENT DOCUMENTS

| 6,541,737 | B1   |   | 4/2003  | Eksin et al. |
| 9,028,137 | B2 * |   | 5/2015  | Sjolund ............... B60N 2/5678 374/29 |
| 9,751,440 | B2 * |   | 9/2017  | Dry ...................... B60N 2/5642 |
| 10,343,565 | B2 * |  | 7/2019  | Baek .................... B60N 2/7017 |
| 2006/0060344 | A1 * | | 3/2006 | Esaki ................. B60H 1/00285 165/287 |
| 2010/0009174 | A1 * | | 1/2010 | Reis ........................ B32B 3/26 428/332 |
| 2012/0315132 | A1 * | | 12/2012 | Axakov ............... B60N 2/5635 415/182.1 |
| 2015/0266405 | A1   |   | 9/2015  | Fitzpatrick et al. |
| 2015/0329027 | A1 * | | 11/2015 | Axakov ................. B60N 2/565 297/180.13 |
| 2016/0009206 | A1   |   | 1/2016  | Perraut et al. |
| 2017/0066355 | A1 * | | 3/2017  | Kozlowski ........... B60N 2/5678 |
| 2018/0056834 | A1 * | | 3/2018  | Line .................... B60N 2/2222 |

FOREIGN PATENT DOCUMENTS

JP   01278825 A * 11/1989 ......... B60H 1/00285

OTHER PUBLICATIONS

JP-01278825-A machine translation (Year: 1989).*

* cited by examiner

*Primary Examiner* — Gordon A Jones
(74) *Attorney, Agent, or Firm* — MacMillan, Sobanski & Todd, LLC (57) ABSTRACT

A temperature control system for a vehicle seat includes a finish trim layer, a thermally conductive panel in thermal contact with the finish trim layer, a thermal device generating a temperature gradient, and a heat transfer structure connecting the panel and the thermal device. The panel and the heat transfer structure are adapted to together thermally conduct the quantity of heat between the finish trim layer and the thermal device.

15 Claims, 5 Drawing Sheets

TEMPERATURE CONTROL SYSTEM PROVIDING CONDUCTIVE HEATING AND COOLING FOR A SEAT

CROSS-REFERENCE TO RELATED APPLICATIONS

This application claims the benefit of U.S. Provisional Application No. 62/475,691, filed Mar. 23, 2017, the disclosure of which is incorporated herein by reference.

BACKGROUND OF THE INVENTION

This invention relates in general to temperature control systems that provide heating and cooling for seats. In particular, this invention relates to an improved structure for a heating and cooling assembly in such a temperature control system that provides conductive heating and cooling for a vehicle seat.

A seat, such as is commonly used in an automotive vehicle, typically includes a cushioning foam bun that is wrapped or otherwise covered in a layer of finish trim. An occupant of the vehicle seat contacts the finish trim layer when sitting on the vehicle seat. The vehicle seat may further have a temperature control system that provides heating or cooling of the finish trim layer for the comfort of the seat occupant. The temperature control system may heat or cool a fluid (such as air, for example) remotely from the finish trim layer. The temperature control system then circulates the heated or cooled fluid through passages extending through the foam bun to conductively convectively heat or cool the finish trim layer.

Typically, the physical thickness or other size of the vehicle seat is fixed or otherwise limited. As a result, the passages extending through the foam bun may reduce an amount of cushioning that the foam bun may otherwise provide within the fixed size of the vehicle seat. This reduction in the amount of cushioning may undesirably reduce the level of comfort afforded by the vehicle seat to the seat occupant. Thus, it would be desirable to provide an improved structure for a temperature control system that provides conductive heating and cooling for vehicle seats that avoids this potential problem.

SUMMARY OF THE INVENTION

This invention relates to an improved temperature control system providing conductive heating and cooling for a vehicle seat. The vehicle seat has a temperature control system having at least one heating and cooling assembly. In turn, the heating and cooling assembly has a thermal device, at least one heat transfer structure, and at least one thermally conductive panel in thermal contact with a finish trim layer of the vehicle seat. The thermal device generates a temperature gradient and is selectively operable as a heat source or a heat sink. Preferably, the thermal device is a Peltier device that is selectively operable as a heat source or a heat sink. The heat transfer structure thermally conducts a quantity of heat between the thermal device and the panels, and the panels thermally conduct the quantity of heat between the heat transfer structure and the finish trim layer. As non-limiting examples, the heat transfer structure may be a heat pipe, and the panels may be copper foil or aluminum foil. A single panel or multiple panels may be provided. Thermally conducting the quantity of heat between the thermal device and the finish trim layer provides heating or cooling of the finish trim layer.

The temperature control system may operate the heating and cooling assembly in a heating mode to heat the vehicle seat. First, the thermal device is operated to generate a first temperature gradient such that the thermal device is operated as a heat source supplying the first quantity of heat. The first quantity of heat is then thermally conducted by the heat transfer structure and the panel to the finish trim layer. A seat occupant is heated by the first quantity of heat in the finish trim layer.

The temperature control system may also operate the heating and cooling assembly in a cooling mode to cool the vehicle seat. The seat occupant occupies the vehicle seat and heats the finish trim layer when a second quantity of heat is thermally conducted from the seat occupant to the finish trim layer. The second quantity of heat is then thermally conducted by the panel and the heat transfer structure to the thermal device. The thermal device is operated to generate a second temperature gradient such that the thermal device is operated as a heat sink receiving the second quantity of heat.

Various aspects of this invention will become apparent to those skilled in the art from the following detailed description of the preferred embodiments, when read in light of the accompanying drawings.

DETAILED DESCRIPTION OF THE PREFERRED EMBODIMENTS

Figure 1:
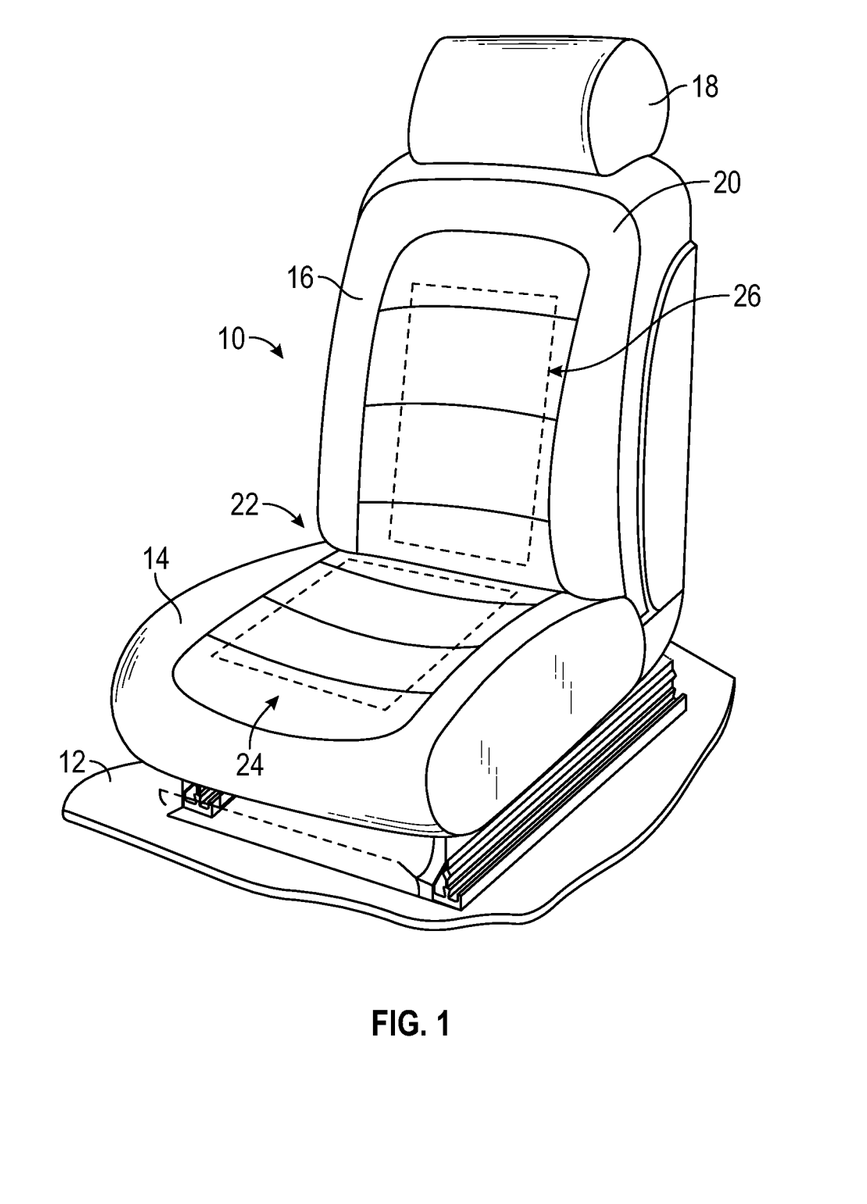
FIG. 1 is a perspective view of a vehicle seat including an improved temperature control system in accordance with this invention.

Referring now to the drawings, there is illustrated in FIG. 1 a seat, indicated generally at 10, that may, for example, be disposed within an automobile or other vehicle. The vehicle seat 10 is mounted on a floor 12 or other support surface of the vehicle and includes a seat bottom 14 and a seat back 16. The seat back 16 may be movable (such as pivotable, for example) or fixed relative to the seat bottom 14. The seat back 16 has an optional headrest 18 attached thereto, opposite the seat bottom 14. The headrest 18 may be a separate component or integrated into the seat back 16. A layer 20, such as a finish trim layer for the vehicle seat 10, covers at least portions of the surfaces of the seat bottom 14, the seat back 16, and the headrest 18 upon which a seat occupant (not shown) sits or otherwise comes into contact. As non-limiting examples, the finish trim layer 20 may be vinyl, cloth, or leather material.

The vehicle seat 10 further includes a temperature control system, indicated generally at 22, for selectively heating and/or cooling the vehicle seat 10. As illustrated, the temperature control system 22 includes a first heating and cooling assembly, indicated generally at 24 and shown by dashed lines, housed within the seat bottom 14 and a second heating and cooling assembly, indicated generally at 26 and also shown by dashed lines, housed within the seat back 16. Discussion of one of the first or second heating and cooling assemblies 24 or 26, respectively, applies to the other of the first or second heating and cooling assemblies 24 or 26, respectively. The temperature control system 22 may operate the first and second heating and cooling assemblies 24 and 26, respectively, either in the same manner or independently of one another.

If desired, the temperature control system 22 may have a greater or fewer number of heating and cooling assemblies than the illustrated first and second heating and cooling assemblies 24 and 26, respectively. As a non-limiting example, multiple heating and cooling assemblies may be provided within either or both of the seat bottom 14 or the seat back 16 to better provide specific heating and/or cooling as desired by the seat occupant. As a further non-limiting example, one of the illustrated first or second heating and cooling assemblies 24 or 26, respectively, may be omitted such that either the seat bottom 14 or the seat back 16 does not have a heating and cooling assembly.

Figure 2:
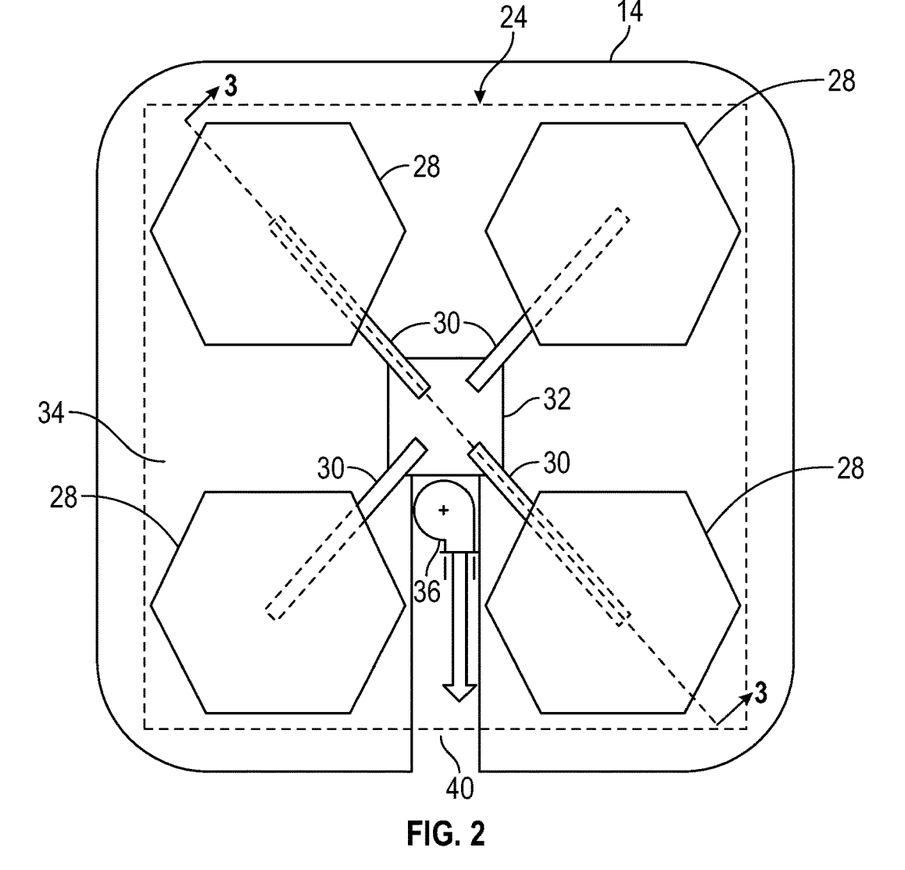
FIG. 2 is a schematic top plan view of a portion of the vehicle seat illustrated in FIG. 1 showing a first embodiment of a heating and cooling assembly of the temperature control system.
Figure 3:
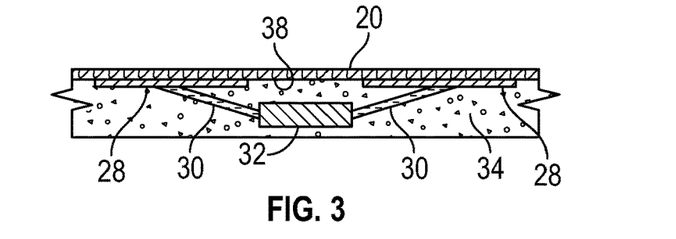
FIG. 3 is a sectional elevational view taken along line 3-3 of FIG. 2 of portions of the first embodiment of the heating and cooling assembly.

FIGS. 2 and 3 schematically illustrate a first embodiment of the first heating and cooling assembly 24. The first embodiment of the first heating and cooling assembly 24 includes a plurality of thermally conductive panels 28 that are connected by respective heat transfer structures 30 to a thermal device 32. Furthermore, the first heating and cooling assembly 24 is supported by a foam bun 34 provided within the seat bottom 14. A fan 36 may be provided to exhaust air from around the thermal device 32. These components of the first heating and cooling assembly 24 will now be discussed in detail.

As best shown in FIG. 3, the panels 28 are preferably positioned within the seat bottom 14 such that the panels 28 are in thermal contact with the finish trim layer 20 covering the seat bottom 14. As will be discussed further below, the panels 28 are utilized to conduct a quantity of heat between the finish trim layer 20 and the heat transfer structures 30. In other words, the panels 28 distribute a quantity of heat to, or collect a quantity of heat from, the finish trim layer 20. Preferably, the panels 28 are formed from one or more thin sheets of a heat conductive material, such as a metallic material or a heat-conducting film. As non-limiting examples, the panels 28 may be fabricated from copper foil or aluminum foil having a thickness in the range of from about 0.1 mm to about 10 mm. The thicknesses of the panels 28 may be locally increased at the heat transfer structures 30 to increase thermal conduction. Alternatively, the panels 28 may be fabricated from any thermally conductive material, including from a composite or other combination of multiple materials.

The panels 28 are preferably flexible under loading from the seat occupant sitting in the vehicle seat 10. As the thickness of the panels 28 increases, it may be desirable that the flexibility of the panels 28 also increases. The panels 28 may be curved or otherwise shaped to fit contours of the foam bun 34 and the seat bottom 14 of the vehicle seat 10. The first heating and cooling assembly 24 may have fewer than or more than the illustrated four panels 28. Furthermore, the panels 28 are not limited to the sizes and shapes illustrated. The panels 28 are preferably sized, shaped, and arranged so as to maximize heating and cooling of the seat bottom 14 by thermal conduction between the panels 28 and the finish trim layer 20. As a non-limiting example, at least 50% of the seat bottom 14 and the seat back 16 may be covered by the panels 28.

The panels 28 may be smooth or alternatively have a three dimensional surface geometry. As a non-limiting example, the panels 28 may have a "wavy" or otherwise undulating surface geometry. Alternatively, the panels 28 may be formed from a porous metallic material with voids, such as a copper sponge or a metallic mesh. Air may flow through the voids to more evenly distribute the quantity of heat within the panels 28 and/or to remove dampness (e.g., perspiration) from the finish trim layer 20.

As used herein, "thermally in contact," and variations thereof, means sufficient contact between two bodies to transfer or otherwise move a quantity of heat between them via thermal conduction. As a non-limiting example, two bodies are thermally in contact when they are in direct physical contact with each other. As a further non-limiting example, two bodies are also thermally in contact when they are separated by a thin layer of non-insulating material, such as an adhesive.

The heat transfer structures 30 are provided to thermally connect each of the panels 28 to the thermal device 32. The heat transfer structures 30 are thermally in contact with the panels 28 and the thermal device 32 such that the heat transfer structures 30 thermally conduct the quantity of heat between the panels 28 and the thermal device 32. As a non-limiting example, the heat transfer structures 30 may be embodied as heat pipes. As a further non-limiting examples, the heat transfer structures 30 may be embodied as structures formed from a highly thermally conductive material, such as graphene, a composite material, or a combination of multiple highly thermally conductive materials. The heat transfer structures 30 preferably have a greater thermal conduction than the foam bun 34. As a result, the quantity of heat is primarily conducted between the panels 28 and the thermal device 32 via the heat transfer structures 30 rather than through the foam bun 34.

The heat transfer structures 30 are preferably fixed or otherwise secured to the panels 28. As non-limiting examples, the heat transfer structures 30 may be spot welded to the panels 28 or fixed to the panels 28 by a suitable adhesive means or mechanical means. Alternatively, the heat transfer structures 30 may not be fixed to the panels 28. Instead the heat transfer structures 30 and the panels 28 may be maintained in contact with one another. As a non-limiting example, the heat transfer structures 30 and the panels 28 may be maintained in contact by a combination of the finish trim 20, the foam bun 34, or any other supporting structure.

The panels 28 and the heat transfer structures 30 act together to provide thermal conduction of the quantity of heat between the finish trim layer 20 and the thermal device 32. As such, the panels 28 and the heat transfer structures 30 are capable of both conducting the quantity of heat from the thermal device 32 to the finish trim layer 20, and conducting the quantity of heat from the finish trim layer 20 to the thermal device 32, depending on a mode of operation (e.g., a cooling mode or a heating mode) of the first heating and cooling assembly 24.

Although illustrated and discussed as separate components, the panels 28 and the heat transfer structures 30 may alternatively be provided as single, combined structures. Each of the single, combined structures would have a panel portion as the panels 28 and a heat transfer portion as the heat transfer structures 30. The single, combined structures may be fabricated from a single thermally conductive material. Furthermore, a single heat transfer structure 30 may connect more than one of the panels 28 to the thermal device 32. When the single heat transfer structure 30 connects more than one of the panels 28 to the thermal device 32, the multiple panels 28 may be formed as a single, combined structure with the heat transfer structure 30. The single, combined structure may have a single thermally conductive material or a combination of different thermally conductive materials.

The thermal device 32 may be embodied as any suitable device that is capable of generating a temperature gradient or difference such that the thermal device 32 is selectively capable of acting as either a heat source or a heat sink. As a non-limiting example, the thermal device 32 may be a heat pump that is selectively operable as either a heat source or a heat sink. Alternatively, a heat source and a heat sink may be provided as separate devices. When the thermal device 32 is operated as a heat source, the thermal device 32 supplies a quantity of heat that is thermally conducted through the heat transfer structures 30 and the panels 28 to the finish trim layer 20. When the thermal device 32 is operated as a heat sink, the thermal device 32 receives a quantity of heat that is thermally conducted from the finish trim layer 20 through the panels 28 and the heat transfer structures 30.

Preferably, the thermal device 32 is a Peltier device that uses the Peltier effect to generate the temperature gradient. The Peltier effect generates a temperature gradient across an electrical junction between two dissimilar materials when the electrical junction is subjected to an electrical current. Whether the temperature gradient produces heating or cooling (i.e., whether the Peltier device functions as a heat source or heat sink) depends on a polarity of the electrical current applied to the Peltier device. Thus, the Peltier device may alternatively operate as a heat source and a heat sink by changing the polarity of the electrical current applied to the Peltier unit.

The heat transfer structures 30 and the panels 28 thermally conduct the quantity of heat between the thermal device 32 and the finish trim layer 20 because heat is conducted from relatively hot temperatures to relatively cold temperatures. Thus, to heat the vehicle seat 10, the thermal device 32 generates a first temperature gradient such that the thermal device 32 is operated as a heat source. As a result, the heat transfer structures 30 and the panels 28 function to thermally conduct a first quantity of heat from the relatively hot thermal device 32 to the relatively cold finish trim layer 20. To cool the vehicle seat 10, the thermal device 32 generates a second temperature gradient such that the thermal device 32 is operated as a heat sink. As a result, the panels 28 and the heat transfer structures 30 function to thermally conduct a second quantity of heat from the relatively hot finish trim layer 20 to the relatively cold thermal device 32. When the thermal device 32 is a Peltier device, the first and second temperature gradients may be generated by reversing the polarity of the current applied to the thermal device 32. The first and second quantities of heat are proportional to a desired amount of heating or cooling, respectively. Absolute values of the first and second quantities of heat may be equal or different as desired.

Similar to the fixing between the heat transfer structures 30 and the panels 28, the heat transfer structures 30 may be fixed or otherwise secured to the thermal device 32 by a suitable adhesive means or mechanical means. As a non-limiting example, the heat transfer structures 30 may be fixed to the thermal device 32 by spot welding, an adhesive means, or a mechanical means, such as an interlocking plug or a screw and socket. Alternatively, the heat transfer structures 30 may not be fixed to the thermal device 32. Instead, the heat transfer structures 30 and the thermal device 32 may be maintained thermally in contact by a combination of the foam bun 34 and any other supporting structure.

As discussed, the foam bun 34 supports the first heating and cooling assembly 24. The foam bun 34 also provides cushioning for the seat bottom 14 and supports the finish trim layer 20 (the finish trim layer 20 is also supported by the panels 28 where the finish trim layer 20 overlays the panels 28). As such, the panels 28 are disposed between the foam bun 34 and the finish trim layer 20 as shown in FIG. 3. As a non-limiting example, the foam bun 34 may be polyurethane foam. As illustrated, the panels 28 are recessed in a top surface 38 of the foam bun 34 such that a smooth surface is provided for the seat occupant. Alternatively, the panels 28 may be other than recessed into the foam bun 34.

Also, the heat transfer structures 30 are supported within the foam bun 34, i.e., the heat transfer structures 30 extend through the foam bun 34. The foam bun 34 extends between the panels 28 and the thermal device 32 such that the foam bun 34 separates the panels 28 and the thermal device 32. As illustrated, the heat transfer structures 30 are linear and inclined through the foam bun 34 between the panels 28 and the thermal device 32. Alternatively, the heat transfer structures 30 may have any arrangement or orientation between the panels 28 and the thermal device 32. As a non-limiting example, at least portions of the heat transfer structures 30 may be non-linear.

Figure 4:
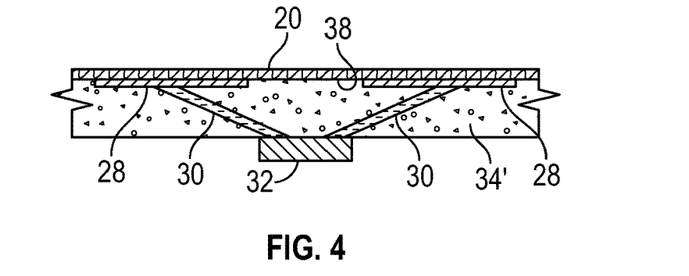
FIG. 4 is a sectional elevational view similar to FIG. 3 of an alternative arrangement of the portions of the first embodiment of the heating and cooling assembly.

Furthermore, the thermal device 32 is illustrated in FIG. 3 as being disposed within the foam bun 34. The thermal device 32 may be positioned within the foam bun 34 during molding of the foam bun 34 or via an access passage that may be subsequently filled with a foam plug (not shown). Alternatively, the thermal device 32 may be positioned other than as illustrated in FIG. 3. As non-limiting examples, the thermal device 32 may be located externally of the foam bun 34' (as illustrated in FIG. 4) or otherwise positioned.

The fan 36 exhausts air (either hot air or cold air) from around the thermal device 32 to outside the seat bottom 14. The air is supplied to around the thermal device 32 via an intake channel (not shown). As illustrated, the fan 36 exhausts the air through a vent channel 40 in the foam bun 34. As illustrated, the vent channel 40 extends to a side surface of the seat bottom 14 such that the air around the thermal device 32 is vented behind the vehicle seat 10. Alternatively, the vent channel 40 may extend other than as illustrated. As a non-limiting example, the vent channel 40 may extend to a bottom surface of the seat bottom 14 and vent the air from around the thermal device 32 to under the vehicle seat 10. Additionally, the vent channel 40 may be extended from that illustrated in FIG. 2 such that the vent channel 40 extends further around the thermal device 32 to provide additional exhausting of the air from around the thermal device 32. Also, the fan 36 may be positioned relative to the thermal device 32 other than as illustrated in FIG. 2.

Figure 5:
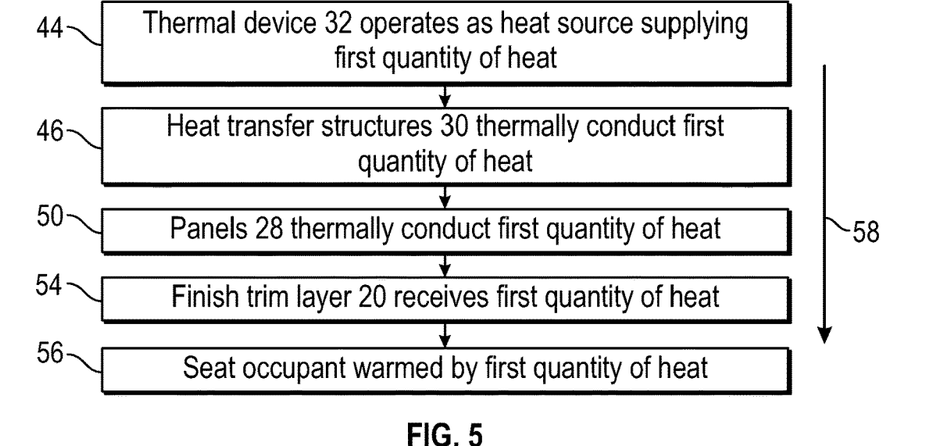
FIG. 5 is a flow chart of a method for operating the heating and cooling assembly of the temperature control system in a heating mode.
Figure 6:
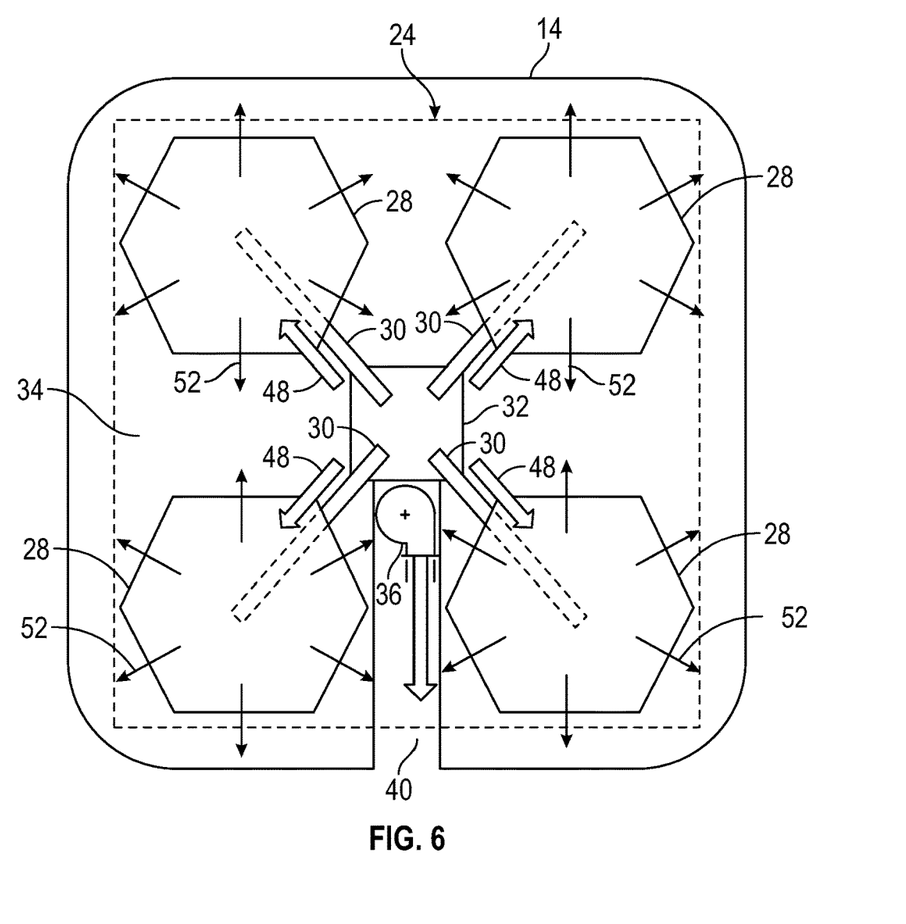
FIG. 6 is a schematic top plan view similar to FIG. 2 showing the heating and cooling assembly of the temperature control system operating in the heating mode.

FIGS. 5 and 6 illustrate a method 42 for operating the first heating and cooling assembly 24 in the heating mode. In an initial step 44 of the method 42, the thermal device 32 is operated as a heat source to generate the first temperature gradient that will supply the first quantity of heat from the thermal device 32 to the finish trim layer 20. Operation of the thermal device 32 as a heat source results in movement (i.e., thermal conduction) of the first quantity of heat from the relatively hot thermal device 32 to the relatively cold finish trim layer 20 because the finish trim layer 20 initially has a lower temperature than the thermal device 32. Thus, the thermal device 32 has, at least initially, a higher temperature than the finish trim layer 20 while the first heating and cooling assembly 24 is operated in the heating mode. The thermal device 32 may start being operated as a heat source before the seat occupant occupies the vehicle seat 10.

In a second step 46 of the method 42, the first quantity of heat is thermally conducted by the heat transfer structures 30 from the thermal device 32 to the panels 28. The thermal conduction of the first quantity of heat in the second step 46 is indicated by first heating arrows 48 in FIG. 6. In a third step 50 of the method 42, the first quantity of heat is thermally conducted by the panels 28 from the heat transfer structures 30 to the finish trim layer 20. The thermal conduction of the first quantity of heat in the step 50 is indicated by second heating arrows 52 in FIG. 6. In a fourth step 54 of the method 42, the finish trim layer 20 receives the first quantity of heat from the panels 28. In a final step 56 of the method 42, the seat occupant is heated by the first quantity of heat in the finish trim layer 20. Thus, in accordance with the heating method 42, the first quantity of heat conductively flows, as indicated by an arrow 58 in FIG. 5, from the thermal device 32 through the heat transfer structures 30 and the panels 28 to the finish trim layer 20 to heat the seat occupant.

Figure 7:
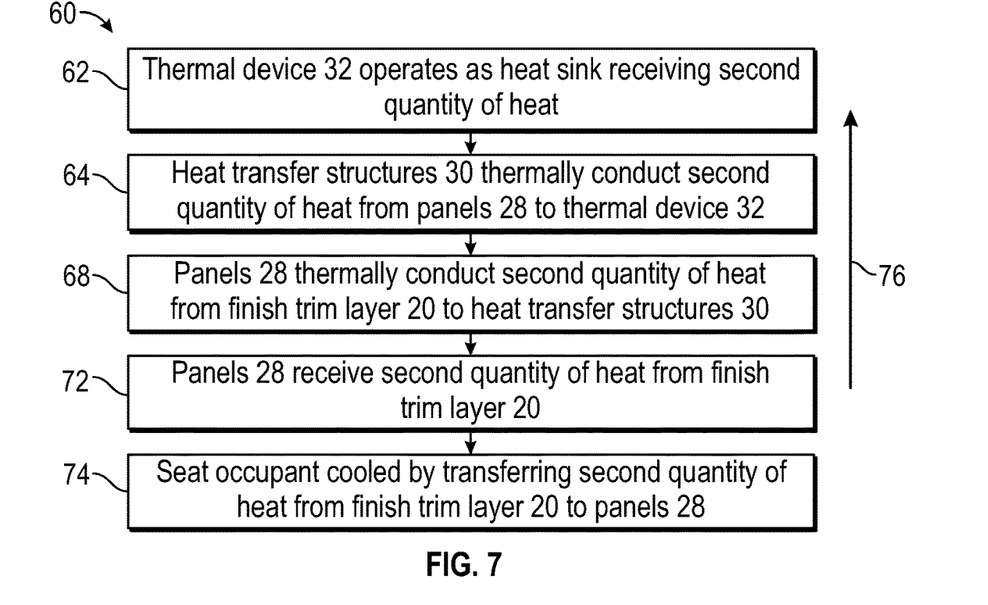
FIG. 7 is a flow chart of a method for operating the heating and cooling assembly of the temperature control system in a cooling mode.
Figure 8:
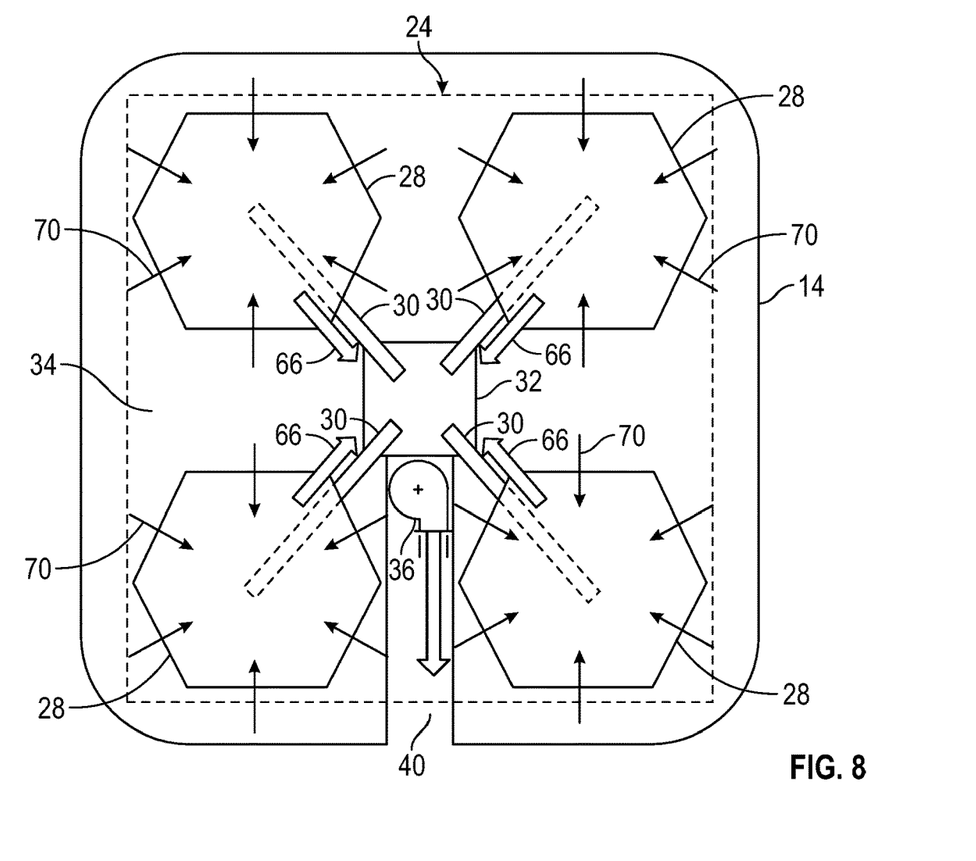
FIG. 8 is a schematic top plan view similar to FIG. 2 showing the heating and cooling assembly of the temperature control system operating in the cooling mode.

FIGS. 7 and 8 illustrate a method 60 for operating the first heating and cooling assembly 24 in the cooling mode. In an initial step 62 of the method 60, the thermal device 32 is operated to generate the second temperature gradient such that the thermal device 32 is operated as a heat sink that will remove the second quantity of heat from the finish trim layer 20. Operation of the thermal device 32 as a heat sink results in movement (i.e., thermal conduction) of the second quantity of heat from the relatively hot finish trim layer 20 to the relatively cold thermal device 32 because the finish trim layer 20 initially has a higher temperature than the thermal device 32. Thus, the thermal device 32 has, at least initially, a lower temperature than the finish trim layer 20 while the first heating and cooling assembly 24 is operated in the cooling mode. The thermal device 32 may start being operated as a heat sink before the seat occupant occupies the vehicle seat 10.

In a second step 64 of the method 60, the second quantity of heat is thermally conducted by the heat transfer structures 30 from the panels 28 to the thermal device 32. The thermal conduction of the second quantity of heat in the second step 64 is indicated by first cooling arrows 66 in FIG. 8. In a third step 68 of the method 60, the second quantity of heat is thermally conducted by the panels 28 from the finish trim layer 20 to the heat transfer structures 30. The thermal conduction of the second quantity of heat in the step 68 is indicated by second cooling arrows 70 in FIG. 8. In a fourth step 72 of the method 60, the panels 28 receive the second quantity of heat from the finish trim layer 20. In a final step 74 of the method 42, the seat occupant is cooled by transferring the second quantity of heat from the finish trim layer 20 to the panels 28. Thus, in accordance with the cooling method 60, the second quantity of heat conductively flows, as indicated by an arrow 76 in FIG. 7, from the finish trim layer 20 through the panels 28 and the heat transfer structures 30 to the thermal device 32 to cool the seat occupant.

Figure 9:
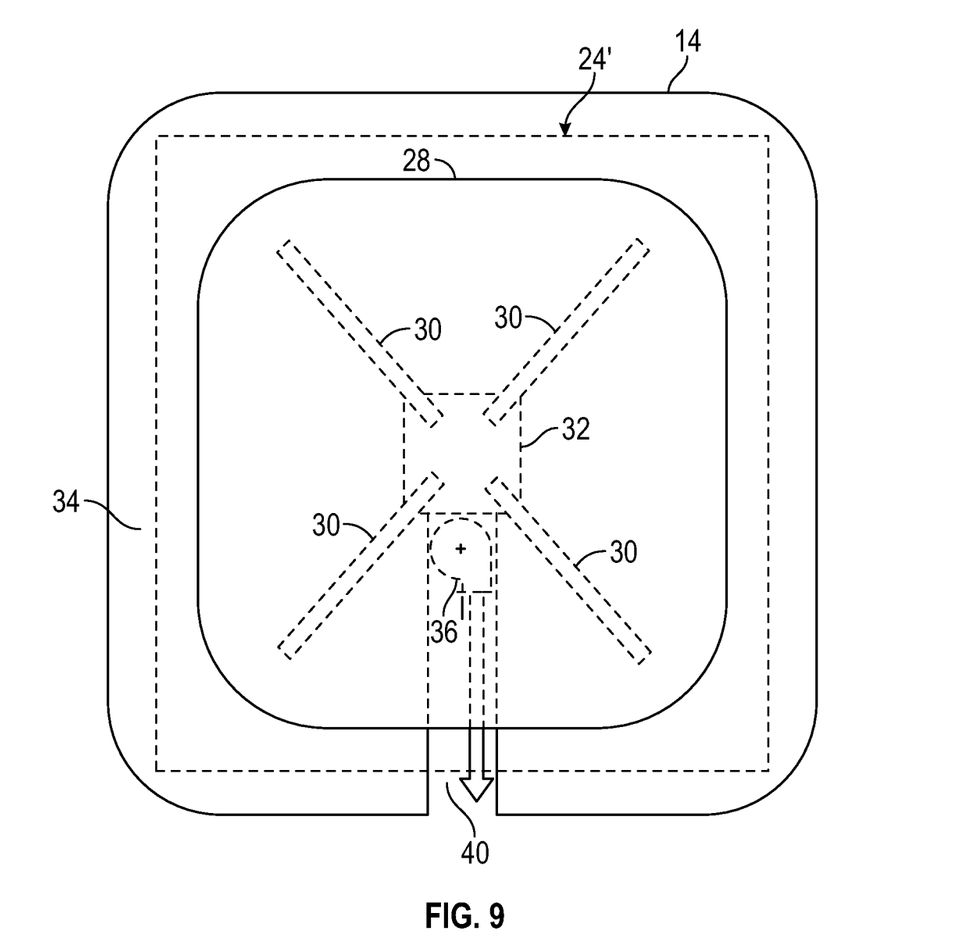
FIG. 9 is a schematic top plan view of a portion of the vehicle seat illustrated in FIG. 1 showing a second embodiment of a heating and cooling assembly of the temperature control system.

FIG. 9 is a schematic top plan view of the seat bottom 14 of the vehicle seat illustrated in FIG. 1 showing a second embodiment of a heating and cooling assembly 24' of the temperature control system 22. In this second embodiment, multiple heat transfer structures 30 connect different portions of a single thermally heat conductive panel 28 to the thermal device 32. Preferably, the multiple heat transfer structures 30 are positioned to maximize an area of the seat bottom 14 through which heat is emitted or absorbed, which also maximizes a rate at which the heat is supplied or received. The second embodiment of the heating and cooling assembly 24' can be operated in the heating and cooling modes substantially as described above.

The principle and mode of operation of this invention have been explained and illustrated in its preferred embodiments. However, it must be understood that this invention may be practiced otherwise than as specifically explained and illustrated without departing from its spirit or scope.

What is claimed is:

1. A heating and cooling assembly for a seat comprising:
a layer adapted to form part of the seat;
plural thermally conductive sheet panels in thermal contact with the layer;
a thermal device at least partially embedded within the seat below the plural thermally conductive sheet panels and adapted to generate a temperature gradient; and
separate heat pipes at least partially embedded within the seat and connecting the plural thermally conductive sheet panels and the thermal device, wherein the plural thermally conductive sheet panels and the separate heat pipes are adapted to together thermally conduct heat between the layer and the thermal device.

2. The heating and cooling assembly of claim 1, wherein the thermal device is a heat sink that receives the heat from the layer.

3. The heating and cooling assembly of claim 1, wherein the thermal device is a heat source that supplies the heat to the layer.

4. The heating and cooling assembly of claim 1, wherein the thermal device is a Peltier device that is selectively operable as either a heat sink or a heat source.

5. The heating and cooling assembly of claim 1, wherein each of the plural thermally conductive sheet panels is a metal foil.

6. The heating and cooling assembly of claim 1, wherein each of the plural thermally conductive sheet panels has a thickness in the range of from 0.1 mm to 10 mm.

7. The heating and cooling assembly of claim 1, wherein each of the plural thermally conductive sheet panels is formed from a porous material with voids.

8. The heating and cooling assembly of claim 1, wherein each of the plural thermally conductive sheet panels is adapted to thermally conduct the heat between the layer and the separate heat pipes, and wherein each of the separate heat pipes is adapted to thermally conduct the heat between the respective thermally conductive sheet panels of the plural thermally conductive sheet panels and the thermal device.

9. The heating and cooling assembly of claim 1, further including a foam bun supporting the layer, wherein each of the plural thermally conductive sheet panels disposed is between the layer and the foam bun.

10. The heating and cooling assembly of claim 9, wherein the foam bun is disposed between the each of the plural thermally conductive sheet panels and the thermal device.

11. The heating and cooling assembly of claim 9, wherein at least a portion of each of the separate heat pipes is disposed within the foam bun.

12. The heating and cooling assembly of claim 1, wherein at least 50% of the layer is in thermal contact with the plural thermally conductive sheet panels.

13. The heating and cooling assembly of claim 1, wherein each of the plural thermally conductive sheet panels has a smooth surface geometry.

14. The heating and cooling assembly of claim 1, wherein each of the plural thermally conductive sheet panels has a three dimensional surface geometry.

15. The heating and cooling assembly of claim 1, wherein each of the plural thermally conductive sheet panels has a thickness that is locally increased at the separate heat pipes.

* * * * *